United States Patent

[11] 3,619,253

[72] Inventor Charles L. Hoffmeyer
 Madison, Tenn.
[21] Appl. No. 788,006
[22] Filed Dec. 30, 1968
[45] Patented Nov. 9, 1971
[73] Assignee E. I. du Pont de Nemours and Company
 Wilmington, Del.

[54] COLOR CONTROL FOR SUEDELIKE POLYMERIC SHEET MATERIALS
10 Claims, No Drawings

[52] U.S. Cl............................................................ 117/66,
 8/4, 8/94.13, 117/63, 117/76 T, 117/135.5, 260/29.6
 F, 356/179, 356/191
[51] Int. Cl............................................................ D06n 3/00
[50] Field of Search........................................... 117/135.5,
 76 T, 66; 356/179, 191; 8/94.13

[56] References Cited
UNITED STATES PATENTS

| | | | |
|---|---|---|---|
| 2,502,014 | 3/1950 | Loggie............................ | 356/191 |
| 2,686,452 | 8/1954 | Bentley........................... | 356/179 |
| 2,797,171 | 6/1957 | Fralish............................ | 117/66 X |
| 3,284,274 | 11/1966 | Hulslander et al............. | 161/159 |
| 3,385,812 | 5/1968 | Brachman....................... | 260/29.6 |

Primary Examiner—William D. Martin
Assistant Examiner—Ralph Husack
Attorney—John E. Griffiths ABSTRACT: A new method for improving the color reproducibility of batch quantities of synthetic suedelike sheet materials is provided by this invention. Batch quantities of newly prepared sheet material, are color corrected to substantially match specific color standards by adjusting the solids content of a fluorochemical and polyorganosiloxane repellency solution between 0.5 and 10 percent solids prior to applying the repellency solution to the sheet material.

COLOR CONTROL FOR SUEDELIKE POLYMERIC SHEET MATERIALS

BACKGROUND OF THE INVENTION

This invention concerns a method for reducing color variations in suedelike synthetic polymeric sheet materials.

Well known processes exist for preparing suedelike sheet material from fibrous substrates containing a microporous surface layer. More particularly, it is known that it is known that such suedelike sheet materials can be made by methods in which a layer of a solution of polymeric material and pigment are first applied to a fibrous substrate. Then the layer of material is coagulated, leached, dried and abraded to form a suedelike sheet material.

While suedelike materials made by such methods are satisfactory in many respects, substantial color variations often occur between batch quantities of materials made at different times. It is believed that color variations are caused by changes in coating thickness, pigment to polymer ratio, coating abrasion or buffing depth, etc. Thus, very slight changes in process conditions cause poor color reproducibility and a resultant decrease in customer approval of the suedelike sheet materials.

SUMMARY OF THE INVENTION

According to the process of this invention color variations between batch quantities of suedelike polymeric sheet materials are substantially reduced by varying the amount of fluorochemical and polyorganosiloxane repellency composition which is applied to the sheet materials after processing. In this way a newly prepared batch of sheet material is color corrected to closely match specific color standards by adjusting the solids content of the repellency solution between 0.5 and 10 percent solids. The exact solids content of the repellency solution to be applied to the sheet materials is determined by first comparing the reflectance measurements for a color standardized sheet material with an untreated sample of a newly prepared batch of sheet material. Then reflectance measurements are made for various samples of the newly prepared batch which have been treated with repellency solutions containing between 0.5 and 10 percent solids. After the treated sample having the least variation between its relectance values of the color standardized material is found, the particular repellency solution used to treat that sample is also used to treat the entire newly prepared batch of sheet material.

DESCRIPTION OF THE INVENTION

This invention concerns a process for improving the color reproducibility of synthetic polymeric sheet materials which have the appearance of natural suede. Such sheet materials can be prepared by:

a. applying a layer of a solution of pigment and polymeric material to a fibrous substrate;

b. coagulating the layer into a honeycomblike cellular structure by bathing the layer in a liquid which is a nonsolvent for the polymeric material and is at least partially miscible with the solvent of the solution of polymeric material;

c. removing substantially all the solvent from the layer;

d. removing substantially all of the nonsolvent from the resulting substantially solvent-free honeycomblike cellular polymeric layer; and finally e. abrading of cutting-away at least a thin surface skin of the layer leaving open cells at the exposed surface.

The above process for preparing these suedelike sheet materials is more fully described in U.S. Pat. No. 3,284,274, issued Nov. 8, 1966, to Hulslander and Manwaring.

After preparing such suedelike sheet materials, various finishing compositions are applied to the materials to improve their oil, stain and water repellency characteristics. For example, mixtures of various fluorochemicals and polyorganosiloxanes, such as those described in U.S. Pat. No. 3,385,812, issued May 28, 1968, to Brachman, have been found to be particularly suitable finishing compositions for the purpose of imparting oil, stain and water repellency.

It has now been discovered that color variations between a color standardized sheet material and a newly prepared batch quantity of sheet material can be reduced by applying a specific predetermined amount of repellency composition to the newly prepared batch of material. In this way the newly prepared batch of sheet material can be color corrected to closely match specific color standards by making minor adjustments in the solids content (or in other words the fluorochemical and polyorganosiloxane content) of the repellency solution. The repellency finish solids content is varied between 0.5 and 10 percent solids to accomplish color correction without impairing finish repellency or product physical properties. More specifically, however, the exact solids content of the repellency solution to be applied is determined by first comparing the green, blue and red reflectance values of a color standardized material and an untreated sample of a newly prepared batch of sheet material. Then green, blue and red reflectance values are measured for various samples of the newly prepared batch which have been treated with repellency solutions containing between 0.5 and 10 percent solids. After the treated sample having the least variation between its reflectance values and the reflectance values of the color standardized material is found, the particular repellency solution used to treat that sample is also used to treat the entire newly prepared batch of sheet material. Although the reflectance measurements can be made on any conventional colorimeter, of course, the use of a highly accurate colorimeter will enhance the color control of the sheet materials even further.

The repellency compositions used in the practice of this invention are described in U.S. Pat. No. 3,385,812, issued May 28, 1968 to Brachman. Accordingly, the disclosure of U.S. Pat. No. 3,385,812 is incorporated herein for the purpose of describing the repellency compositions and to show methods for their preparation. The fluorochemicals used in the repellency compositions contain perfluoroalkyl moieties attached to various other moieties. One such fluorochemical, type (A), is polymeric; at least 35 percent (by weight) of the monomers used to make this fluoropolymer can be represented by the formula (A) $$CH_2=\overset{R}{\underset{|}{C}}-\overset{O}{\underset{\|}{C}}-X-(CF_3)_mCF_3$$

where
R can be H, $-CH_3$, $-CH_2CH_3$ or halogen
X can be $-O-(CH_2)_n-$, $-NH-(CH_2)_n-$,

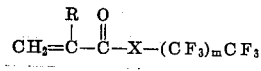

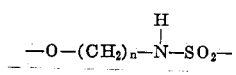

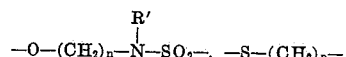

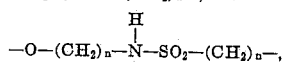

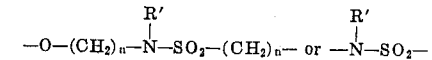

wherein $n$ is a number 1 through 14 and R' is an alkyl radical of one through six carbon atoms, and $m$ is a number one through 13.

This means that the polymer can be a homopolymer of such monomer units. As a general rule, however, the monomers of the formula A will be copolymerized with other ethlenically unsaturated monomers such as alkyl acrylates and alkyl methacrylates; vinyl esters of aliphatic acids; styrene and alkyl styrenes; vinyl halides; vinylidene halides; hexafluoropropene; allyl esters; vinyl alkyl detones; acrylamides; and dienes such as 1,2-butadiene, 1,3-butadiene, 2-chloro-1,3-butadiene, 2,3-dichloro-1,3-butadiene and isoprene.

Another type of fluorochemical, type (B), can be represented by the structure (B)
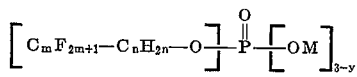

where

M is a water solubilizing cation such as hydrogen, alkali metal, ammonium or substituted ammonium;

$y$ is a number of average value from 1.0 to 2.5;

$m$ is a number 4 through 12; and $n$ is a number 1 through 16; with $C_m$ and $C_n$ making up a straight chain of not less than eight carbon atoms.

The polyorganosiloxanes used in the repellency compositions are curable substantially linear polymers represented by the general formula

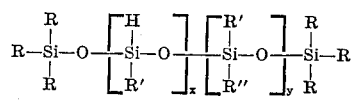

wherein R, R' and R'' can be methyl, ethyl, propyl, phenyl, $-OCH_3$ or $-OC_2H_5$.

However, 60 through 100 mol percent of these substituents must be methyl. The silicon atoms within the brackets must bear from about 0.3 to 1 hydrogen atom and from 1 through 1.7 R' or R'' groups each, the total, of course, being two. The value of $x$ and $y$ must be such that the molecular weight of the polymer is at least 500.

By "curable polyorganosiloxane" is meant a lower molecular weight siloxane which can be converted to a higher molecular weight nonmigratory form. Polyorganosiloxanes of this type are available commercially The fluorochemicals used in the finishing compositions of the invention are ordinarily made and supplied as aqueous dispersions, as organosols, as emulsions, or as solutions in water or organic solvents such as "FREON® fluorocarbon. Fluorochemicals preferred for use in the compositions of the invention are usually provided as aqueous dispersions containing from about 20 to 50 percent by weight of fluorochemical solids.

The polyorganosiloxanes are ordinarily supplied as aqueous emulsions or as solutions in such organic solvents as perchloroethylene or Stoddard solvent. Polyorganosiloxanes preferred for use in the compositions of the invention are usually provided as aqueous emulsions containing about 40 percent by weight of polymer solids.

To make a suitable repellency composition one simply selects suitable components, in suitable and compatible liquid forms, and blends them to provide from 10 percent through 75 percent, preferably 25 percent through 45 percent of a polyorganosiloxane and from 25 percent through 90 percent, preferably 50 percent through 75 percent, of a fluorochemical, by weight of the total of fluorochemicals and polyorganosiloxane. The precise ratio of siloxane to fluorochemical in a composition will depend upon the degree of repellency, etc. desired, the material to be treated and like factors, and can be easily determined by one skilled in the art.

Similarily, the total amount of fluorochemical and siloxane in a composition will vary according to material being treated, the equipment being used, and like factors. The compositions will contain from about 0.5 through 10 percent, by weight of the total composition, of combined fluorochemical and siloxane solids.

The blending is done in conventional mixing equipment, preferably a propeller-type apparatus. A mixing time of 15 through 30 minutes is usually sufficient. After blending the compositions are ready for use.

Although a polyorganosiloxane curing agent is not essential in the compositions of the invention, it is preferred that such agents be present because the polysiloxanes cure rather slowly by themselves, even on application of heat. Illustrative of the curing agents which can be used are zinc salts, zinc soaps, tin salts, tin soaps and organic amines. Examples of these are zinc stearate, zinc acetate, dibutyl tin dilaurate and dibutyl tin diacetate. The polysiloxane curing agents are usually provided as aqueous dispersions and are ordinarily present in the compositions of the invention at concentrations which give 2 through 5 percent by weight of metal based on the polyorganosiloxane solids in the compositions. A curing agent preferred for the stability it gives the polyorganosiloxane emulsions is "Y-4306" made and sold by the Union Carbide Company.

Although for repellency purposes alone the fluorochemicals and polyorganosiloxanes can be incorporated directly into the suedelike sheet material by adding the repellency composition to the polymeric solution, for the purposes of this invention the repellency solution is applied to the sheet material after all of the processing steps for preparing the sheet material have been carried out. In this way the use of the repellency solution accomplishes both color control and treatment for oil, stain and water repellence.

The formula A fluorochemicals are preferred for use in this invention. Highly preferred because of their availability and the excellence of results obtained with them are copolymers of a monomer having the structure (C)
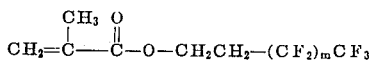

where $m$ is a number 1 through 13, with other acrylic or methacrylic esters.

Especially preferred for general finishing use, for the same reasons, are terpolymers of monomers of formula C, n-butyl acrylate and N-methylol acrylamide. Most preferred is a terpolymer of a. a mixture of formula C monomer compounds in which $m$ is 6, 8 and 10 in a 3:2:1 numerical ratio with small amounts of 12 and 14 present;

b. n-butyl acrylate; and c. N-methylol acrylamide;

the monomer unit weight ratio of this terpolymer being 1,000/- 20/3, respectively. This terpolymer will hereinafter be called the "1,000/20/3 terpolymer."

When compositions containing fluorochemical, polyorganosiloxane and polyurethane are used in the preparation of suede material, the formula B fluorochemicals are preferred because of their solubility in dimethylformamide.

Especially preferred for the same reasons are type (B) fluorochemicals represented by the formulas (D)
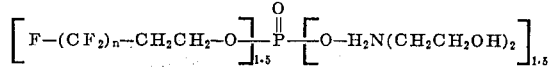

(E)
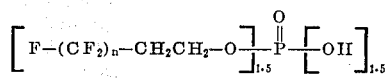

and (F)
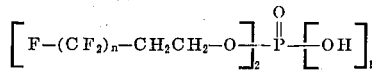

In these three formulas $n$ is 6, 8 and 10 in a numerical ratio of 3:2:1.

The repellency compositions intended for general use are applied to substrates at concentrations which will give from 0.05 to 0.4 oz. (dry basis)/sq. yd. of material. For most uses, however, concentrations of from 0.1 to 0.15 oz./sq. yd. are satisfactory.

The compositions are applied to the substrates by conventional methods. They can, for example be applied by dipping, brushing, spraying, or by direct gravure application. After the compositions have been applied, they can be air dried. For optimum repellency characteristics, however, especially when the compositions are used to treat sueded sheet materials, they are heat cured for from about 1½ to 6 minutes at a temperature of from about 230° to 280° F.

In a variation of this method, the fluorochemicals and polyorganosiloxanes, in solution or dispersion, can be applied separately, at the concentrations they are applied together, and dried to provide layered finishes which give the treated materials the same desirable properties as though the fluorochemicals and polyorganosiloxanes were applied in combination.

As mentioned previously, the solids content of the repellency solutions refers to the percent by weight of total composition, of the combined fluorochemical and siloxane solids. In most applications the remaining portion of repellency solution is water. Thus variations in the amount of water used in the repellency solution will vary the solids content.

A process used to prepare the suedelike sheet materials is described in U.S. Pat. No. 3,284,274, issued Nov. 8, 1966 to Hulsander and Manwaring. Accordingly, the disclosure of U.S. Pat. No. 3,284,274 is incorporated herein for the purpose of describing suitable substrates, polymer solutions and process details for making suedelike sheet materials. It is understood, however, that the color correction techniques of this invention could be used in conjunction with other processes to prepare suedelike sheet materials.

In the process disclosed in U.S. Pat. No. 3,284,274 a layer of a solution of polymeric material is applied to a fibrous substrate and then the layer is treated by coagulating, leaching, drying and abrading it to form a suedelike sheet material.

The following examples are presented so that the invention will be more easily understood and readily practiced. All parts and percentages are by weight unless otherwise specified.

EXAMPLE 1

A synthetic polymeric sheet material is prepared according to the procedure of example 2 of U.S. Pat. No. 3,284,274, issued Nov. 8, 1966, except that:

1. 1 part of the following mixture of pigments is used in place of the 8 parts carbon black:

|  | Parts |
| --- | --- |
| Monstral Red | 0.16 |
| Vat Yellow | 0.44 |
| Lamp Black | 0.12 |
| TiO$_2$ | 0.26 |
| Phthalocyanine | 0.02; |

2. the mixture of pigments is ground with 2.83 parts of a 87 percent polyvinyl chloride/ 13 percent polyvinyl acetate solution to facilitate blending;

3. 697 parts of methyl ethyl ketone is added to the pigment/polymer mixture; and 4. 89.2 parts of the polyvinyl chloride polyurethane solution described in example 1 of US Pat. No. 3,284,274 is added to the pigment/polymer mixture.

The pigment/polymer mixture of (1)–(4) above is used in place of the polyvinyl chloride polymer/carbon black pigment of example 2 of U.S. Pat. No. 3,284,274.

Next green, blue and red reflectance measurements for a color standardized sheet material are made with a "Colorimaster" colorimeter. The following reflectance values are observed:

REFLECTANCE VALUES

| Green | Red | Blue |
| --- | --- | --- |
| 48.7 | 57.2 | 37.0 |

Three small sections of the synthetic polymeric sheet material are treated with repellency solutions, having 0.5 percent, 3.0 percent and 4.5 percent solids respectively:

0.5 PERCENT SOLIDS

An aqueous dispersion of a 40/60 copolymer of stearyl methacrylate and Formula C monomer where $m$=6, 8 and 10 in a 3:2:1 weight ratio, with small amounts of 12 and 14 present (25% solids) | 120
Water | 10,370
Triton X-100 (isooctyl phenyl polyethoxy ethanol, Rohm & Haas Co.) | 1
"Y-4034" (a polyorganosiloxane emulsion containing 40% solids) | 57.5
"Y-4306" polyorganosiloxane curing agent (40% solids) (Union Carbide Co.) | 0.69

3.0 PERCENT SOLIDS

Same as 0.5 percent solids except that 1570 parts water is used instead of 10,370 parts water 4.5 PERCENT SOLIDS Same as 0.5 percent solids except that 980 parts water is used instead of 10,370 parts water.

The concentration of repellency composition on each sample is about 0.11 oz./sq. yd. (dry basis). Next the green, blue and red reflectance measurements for the samples are made with a "Colormaster" colorimeter. The following reflectance values are observed:

| Percent Solids of Repellency Solution | Reflectance Values | | |
| --- | --- | --- | --- |
|  | Green | Blue | Red |
| 0.5 | 64.8 | 75.5 | 44.8 |
| 3.0 | 48.7 | 57.4 | 38.0 |
| 4.5 | 50.7 | 59.8 | 38.4 |

After observing the above reflectance readings, it is determined that a repellency solution having a 3.0 percent solids content when applied to the sheet material provides a substantial match in reflectance values with the color standardized sheet material. Therefore, the entire batch of sheet material is treated with the repellency solution having a 3.0 percent solids content. In this way a close color match between the color standardized sheet material and the sheet material prepared above is provided. EXAMPLES 2–9

The following fluorochemical monomers substituted, in equivalent amounts, for the formula C fluorochemical monomer used in example 1. The resulting compositions are used in the same way to accomplish substantially the same results as in example 1.

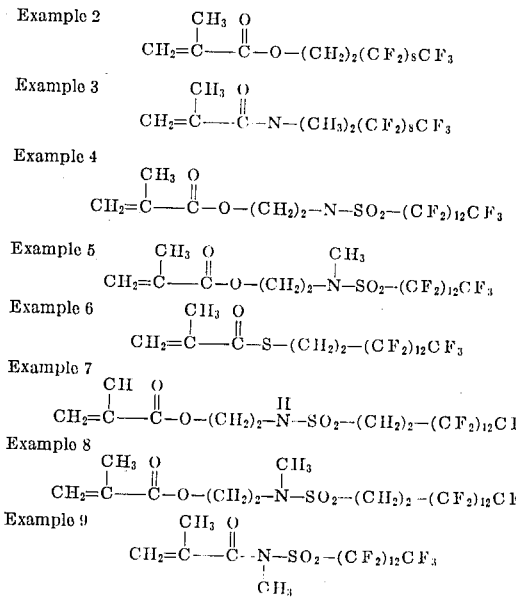

What is claimed is:

1 A process for reducing color variations in suedelike synthetic polymeric sheet materials which consists essentially of a. measuring the reflectance values or a color standardized suedelike synthetic polymer sheet material and an untreated sample of a newly prepared batch of suedelike synthetic polymeric sheet material, the standardized suedelike synthetic polymeric sheet material and the newly prepared batch of suedelike synthetic polymeric sheet material being of the same base material;

1. measuring the reflectance values of samples of the newly prepared batch of suedelike synthetic polymeric sheet material which have been treated with different concentrations of repellency solution having which vary between 0.5 and 10 percent solids content;

c. locating the treated sample of newly prepared suedelike synthetic polymeric sheet material which has the least variation between its reflectance values and the reflectance values of the color standardized suedelike synthetic polymeric sheet material; and d. treating the entire batch of newly prepared suedelike synthetic polymeric sheet material with the repellency solution of the same solids content which was used to treat the sample having the least variation between its reflectance values and the reflectance values of the color standardized suedelike synthetic polymeric sheet material.

2. The process of claim 1 wherein said repellency solution consists essentially of
   a. a fluorochemical which is
      1. a substantially linear polymer of ethylenically unsaturated monomers, at least 35 percent (by weight) of said monomers being represented by the formula $$CH_2=C(R)-C(=O)-X-(CF_2)_m CF_3$$

where
R is H, $-CH_3$, $-CH_2CH_3$ or halogen

X is $-O-(CH_2)_n-$, $-NH-(CH_2)_n-$, $-O-(CH_2)_n-N(H)-SO_2-$,
$-O-(CH_2)_n-N(R')-SO_2-$, $-S-(CH_2)_n-$, $-O-(CH_2)_n-N(H)-SO_2-(CH_2)_n$
$-O-(CH_2)_n-N(R')-SO_2-(CH_2)_n-$ or $-N(R')-SO_2-$ where $n$ is a number 1 through 14 and
R' is an alkyl radical of 1 through 6 carbon atoms and
$m$ is a number 1 through 13;
or
      2. a compound represented by the formula $$\left[ C_m F_{2m+1}-C_n H_{2n}-O \right]_y \overset{O}{\underset{\|}{P}} \left[ OM \right]_{3-y}$$

where M is hydrogen, alkali metal, ammonium or substituted ammonium;
$y$ is a number of average value from 0.1 to 2.5;
$m$ is a number 4 through 12;
$n$ is a number 1 through 16;
with $C_m$ and $C_n$ making up a straight chain of not less than 8 carbon atoms;
   b. a curable substantially linear polyorganosiloxane represented by the structure $$R-\underset{R}{\overset{R}{Si}}-O-\left[\underset{R'}{\overset{H}{Si}}-O\right]_x\left[\underset{R''}{\overset{R'}{Si}}-O\right]_y\underset{R}{\overset{R}{Si}}-R$$

where R, R' or R" is $-CH_3$, $-C_2H_5$, $-C_3H_7$, phenyl, $-OCH_3$ or $-OC_2H_5$, 60% through 100% (mol) being $-CH_3$ and the silicon atoms within the brackets each bearing from 0.3 to 1 hydrogen atom and from 1 through 1.7 [R] R' or R" groups, the total being two:
   $x$ and $y$ are numbers which will give the siloxane a molecular weight of at lest 500;
   The amount of fluorochemical in the composition being 25 percent through 90 percent and the amount of polyorganosiloxane being 10 percent through 75 percent by weight of the total of (a) and (B); and
   C. a liquid carrier.

3. The process of claim 2 wherein the fluorochemical in subheading (A) is a polymer as described in subheading (1).

4. The process of claim 3 wherein the fluorochemical is a substantially linear polymer of ethylenically unsaturated monomers, at least 35 percent (by weight) of said monomers having the structure.

$$CH_2=C(CH_3)-C(=O)-O-CH_2CH_2(CF_2)_m CF_3$$

where $m$ is a number 1 through 13.

5. The process of claim 4 wherein the fluorochemical is a terpolymer of
   a. a mixture of $$CH_2=C(CH_3)-C(=O)-OCH_2CH_2(CF_2)_m CF_3$$

where $m$ is 6, 8 and 10 in a 3:2:1 numerical ratio with a small amount of 12 and 14 present;
   b. n-butyl acrylate, and
   c. N-methylol acrylamide the weight ratios of (a), (b), and (c) being 1000/20/3 respectively.

6. The process of claim 5 wherein the carrier is water.

7. The process of claim 2 wherein the fluorochemical in subheading (A) is a compound as described in subheading (2).

8. The process of claim 7 wherein the fluorochemical is one represented by the formula $$\left[ F-(CF_2)_n-CH_2CH_2O \right]_{1.5} \overset{O}{\underset{\|}{P}} \left[ OH \right]_{1.5}$$

where $n$ is 6, 8 and 10 in a numerical ratio of 3:2:1.

9. The process of claim 7 wherein the fluorochemical is one represented by the formula.

$$\left[ F-(CF_2)_n-CH_2CH_2O \right]_{2} \overset{O}{\underset{\|}{P}} \left[ OH \right]_{1}$$

where $n$ is 6, 8 and 10 in a numerical ratio of 3:2:1.

10. The process of claim 7 wherein the fluorochemical is represented by the formula $$\left[ F-(CF_2)_n-CH_2CH_2O \right]_{1.5} \overset{O}{\underset{\|}{P}} \left[ O-H_2N(CH_2CH_2OH)_2 \right]_{1.5}$$

where $n$ is 6, 8 and 10 in a numerical ratio of 3:2:1.

PO-1050
(5/69)

UNITED STATES PATENT OFFICE
CERTIFICATE OF CORRECTION

Patent No. 3,619,253     Dated November 9, 1971

Inventor(s)     Charles L. Hoffmeyer

It is certified that error appears in the above-identified patent and that said Letters Patent are hereby corrected as shown below:

Column 7, Claim 1, line 11: "1." should read --b.--.

Column 7, Claim 2, line 3: "a." should read --A.--.

Column 7, Claim 2, line 9: "$-CH_2{}_{CH_3}$" should read -- $-CH_2CH_3$ --.

Column 7, Claim 2, line 26: "b." should read --B.--.

Column 8, Claim 2, line 29: "$-Ch_3$" should read --$CH_3$--.

Column 8, Claim 2, line 39: "(a)" should read --(A)--.

Column 8, Claim 4, line 1: "THe" should read --The--.

Signed and sealed this 25th day of April 1972.

(SEAL)
Attest:

EDWARD M. FLETCHER, JR.      ROBERT GOTTSCHALK
Attesting Officer            Commissioner of Patents